(12) United States Patent
Kotecha et al.

(10) Patent No.: US 10,051,461 B2
(45) Date of Patent: Aug. 14, 2018

(54) ENHANCED DYNAMIC FEATURE SUPPORT IN WIRELESS DIAMETER-BASED NETWORKS

(71) Applicant: Verizon Patent and Licensing Inc., Arlington, VA (US)

(72) Inventors: Lalit Ratilal Kotecha, San Ramon, CA (US); Sudhakar Reddy Patil, Flower Mound, TX (US); Hossein M. Ahmadi, Parsippany, NJ (US); Robert Avanes, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 193 days.

(21) Appl. No.: 15/062,719

(22) Filed: Mar. 7, 2016

(65) Prior Publication Data
US 2017/0257755 A1 Sep. 7, 2017

(51) Int. Cl.
*H04W 8/22* (2009.01)
*H04L 29/08* (2006.01)
*H04L 29/12* (2006.01)

(52) U.S. Cl.
CPC ........... *H04W 8/22* (2013.01); *H04L 61/1588* (2013.01); *H04L 61/203* (2013.01); *H04L 67/1036* (2013.01)

(58) Field of Classification Search
None
See application file for complete search history.

(56) References Cited

U.S. PATENT DOCUMENTS

| | | | |
|---|---|---|---|
| 2011/0320555 A1* | 12/2011 | Qiu | H04L 63/08 709/207 |
| 2012/0155389 A1* | 6/2012 | McNamee | H04L 45/306 370/328 |
| 2013/0170431 A1* | 7/2013 | Mann | H04L 67/1036 370/328 |
| 2013/0227138 A1* | 8/2013 | Cai | H04W 12/08 709/225 |

\* cited by examiner

*Primary Examiner* — Kevin C Harper
*Assistant Examiner* — Derrick V Rose

(57) ABSTRACT

A computer device may include logic configured to receive a request from a user equipment device or a network device; identify a responding wireless access network device to process the request; and determine whether information identifying supported features for the responding wireless access network device has been obtained. The logic may be further configured to request a list of supported features from the responding wireless access network device, when the information identifying the supported features for the responding wireless access network device has not been obtained by the computer device; receive, from the responding wireless access network device, a response that includes the list of the supported features and that further includes supported features scope information; store the supported features scope information; and use the supported features scope information when forwarding requests to the responding wireless access network device or the plurality of devices.

20 Claims, 7 Drawing Sheets

ENHANCED DYNAMIC FEATURE SUPPORT IN WIRELESS DIAMETER-BASED NETWORKS

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A provider may manage a large number of devices associated with a large number of wireless access networks. When a new feature is made available, the new feature may first be deployed in some of the devices and deployment may be delayed in other ones of the devices. Therefore, keeping track of which features are available in which devices may be complicated.

DETAILED DESCRIPTION OF PREFERRED EMBODIMENTS

Figure 1:
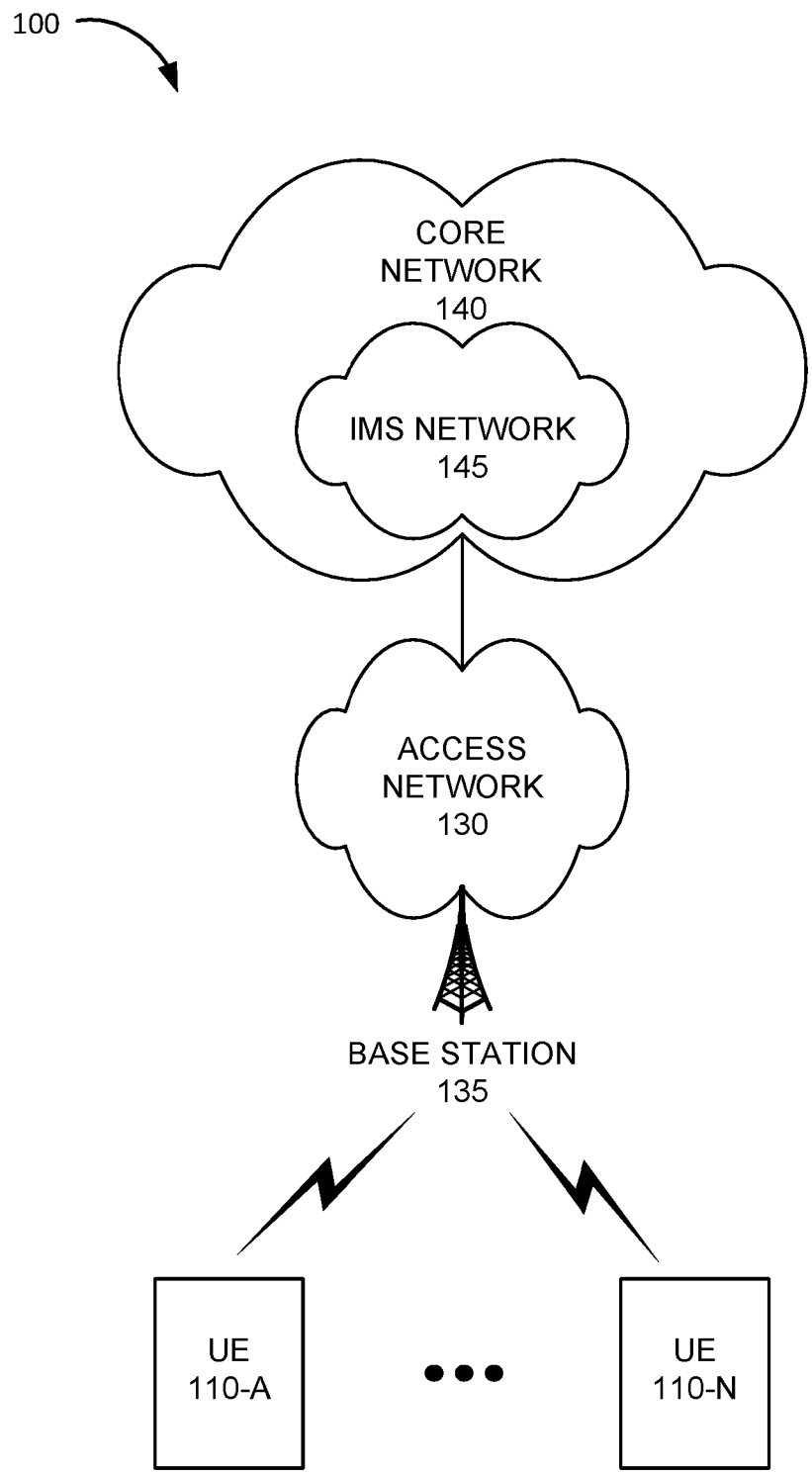
FIG. 1 is a diagram illustrating an environment according to an implementation described herein.

The following detailed description refers to the accompanying drawings. The same reference numbers in different drawings identify the same or similar elements.

A provider of wireless communication services may manage wireless access networks that include a large number of network devices. The network devices may be independently upgraded. When a network device is upgraded, the network device may include new features that may be made available when communicating with another device. However, in order for other network devices to become aware of the new features, the other network devices may need to employ a dynamic discovery process to discover the newly available features. Furthermore, new features may be added as optional and/or discoverable features that require that the discovery process be employed by other devices. Moreover, being able to discover supported features may be useful in handling roaming scenarios.

The network devices may communicate with each other using particular protocols. For example, Diameter is a peer-to-peer protocol that may be used in wireless access networks to carry signaling and control messages. As an example, in a Long Term Evolution (LTE) wireless access network, Mobility Management Entities (MME) and Home Subscriber Servers (HSS's) may communicate using an S6a interface application running on top of a Diameter protocol. Network devices may include a mechanism to discover features that are supported by peers (i.e., other network devices). Based on knowledge of features supported by another device, a first network device may determine if a request can be processed by a second network device. For example, if an MME indicates capability to support Proxy Call Session Control Function (P-CSCF) Restoration, then an HSS may send an S6a Insert Subscription Data Request (IDR) message to invoke P-CSCF restoration procedures. However, if the MME does not include the P-CSCF Restoration capability, then the HSS may not be able to send the S6a: IDR message. Therefore, dynamic discovery is required in large networks so that network devices may be independently upgraded.

The $3^{rd}$ Generation Partnership Project (3GPP) has introduced a Supported Features mechanism based on a host level discovery of Supported Features. However, in large networks, the number of peer hosts (i.e., network devices communicating with each other) may be in the thousands. A group of hosts may be grouped into a system functioning as a logical entity. If all the hosts within the logical entity support a same set of features, a peer host may have to discover supported features on a per host basis. Thus, the peer host may need to potentially exchange thousands of messages with the hosts that are included in the logical entity in order to obtain information relating to the supported features by each of the hosts. Such a process may be complex and inefficient. Furthermore, even if a peer determines that a transaction is to be processed by the logical entity that includes many hosts, the peer may not know ahead of time which particular host within the logical entity may be selected to handle the transaction. Thus, the peer may not be able to take advantage of available supported features.

As an example, subscribers in a particular geographic area may be hosted by an HSS system function as a logical entity that includes multiple HSS front end hosts. If an MME discovers features supported by a first HSS front end device while processing a request for a first user equipment (UE) device, the MME may not be able to use the obtained supported features information for a second UE device hosted by the HSS system, because a request for the second UE device may be handled by another HSS front end device that is part of the HSS system.

Implementations described herein relate to enhanced dynamic feature support in large wireless networks. When a network device advertises a list of supported features, the network device may specify a supported features scope. The supported features scope may identify whether an advertised list of supported features applies only to the advertising host or whether the advertised list of supported features applies to multiple hosts, such as hosts included in a host system functioning as a logical entity. A network device may be able to discover supported features in the network more efficiently by receiving the supported features scope information and associating multiple network devices with the supported features based on the supported features scope information.

For example, a first HSS front end device may specify the scope for supported features to be at a logical HSS level corresponding to an HSS system. When an MME receives the supported features scope information from the first HSS front end device, the MME may use the information to determine that all HSS front ends associated with the HSS system include the advertised list of supported features and may use the supported features for another HSS front end when processing a transactions without having to execute a supported features discovery process for the other HSS front end.

A network device may receive a request from a UE device, a requesting wireless access network device, or an Internet Protocol Multimedia Subsystem (IMS) device and may identify a responding wireless access network device to process the request. The network device may include, for example, an MME device, a Packet Data Network Gateway (PGW) device, a CSCF device, an IMS Application Server (AS) device, and/or another type of device in a wireless access network or communicating with a wireless access network. The request may be, for example, to access subscriber information for a UE device, to authenticate the UE device, to authorize the UE device for a particular service, to establish a network connection, to reserve network resources for a particular Quality of Service (QoS) class, and/or a request to perform another type of service.

The network device may identify a responding network device to process the request and may determine whether information identifying supported features for the responding network device has been previously obtained or determined. The responding network device may include, for example, a Diameter Routing Agent (DRA) configured as a load balancer for a system function as a logical entity for a group of Diameter hosts (e.g., a group of HSS front end devices). The network device may determine that the supported features for the responding network device have been obtained based on either previously having received a list of supported features from the responding network device or from another network device, which is part of a same logical entity as the responding network device and which has previously indicated in a message to the network device that a supported features scope extends to the logical entity. If the network device determines that the supported features are known (e.g., have been previously obtained), the received request may be sent to the responding network device based on the obtained list of supported features. For example, the network device may make use of an available feature from the list of supported features and may modify the request to utilize the available feature.

If supported features for the responding network device are not known (e.g., have not been previously obtained), the network device may request a list of supported features from the responding network device before sending the request to the responding network device for processing. The responding network device may reply with a response that includes a list of supported features and that includes supported features scope information that indicates whether the list of supported features applies only to the responding network device or to a group of network devices that include the responding network device.

The network device may store the supported features list and the supported features scope information in association with the responding network device or the group of network devices. For example, if the supported scope information indicates that the supported features list applies to a group of networking devices corresponding to a logical entity, the network device may associate the list of supported features with all the devices in the group of networking devices. Thus, the network device may use the supported features scope information when sending requests to network devices that are part of the logical entity.

For example, the network device may receive another request, may identify another network device to process the request, and may determine that supported features for the other network device are known based on the other network device being part of the logical entity. The network device may then associate the list of supported features with the other network device and may send the other request to the other network device using the list of supported features.

In some implementations, the network devices may communicate using a Diameter protocol. As an example, a Supported-Features attribute-value pair (AVP) may identify a list of supported features and a Supported-Features-Scope AVP may identify the scope of the supported features. As another example, the Supported-Features-Scope AVP may be specified as a sub-AVP within the Supported-Features AVP. The Supported-Features-Scope AVP may include a Supported-Features-Attribute identifier and a value that identifies the supported features scope. For example, a Host value may identify the supported features scope as applying only to the host device sending the message and a Realm value may identify the supported features scope as applying to a realm of devices to which the host device belongs. For example, a system that functions as a logical entity of host devices may be designated as a realm. In other implementations, the network devices may communicate using another protocol, such as a General Packet Radio Service (GPRS) Tunneling Protocol Control (GTP-C) protocol, a Session Initiation Protocol (SIP), an over the air protocol (e.g., a Radio Resource Control protocol, etc.), and/or another type of protocol that may be used in a wireless access network.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE devices 110" and individually as "UE device 110"), an access network 130, and a core network 140.

UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

In some implementations, UE device 110 may correspond to an embedded wireless device that communicates wirelessly with other devices over a machine-to-machine interface. For example, UE device 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, a parking meter, etc.), and/or another type of electronic device.

Access network 130 may provide access to core network 140 for wireless devices, such as UE device 110. Access network 130 may enable core network 140 to provide voice communication service and/or data services to UE device 110. Access network 130 may include a base station 135 and UE device 110 may wirelessly communicate with access network 130 via base station 135. Access network 130 may establish a packet data network connection between UE device 110 and core network 140. For example, access network 130 may establish an Internet Protocol (IP) connection between UE device 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In some implementations, core network 140 may include an IMS network 145. IMS network 145 may include a network for delivering IP multimedia services as specified by 3GPP or other standards/protocols and may provide media flows between UE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
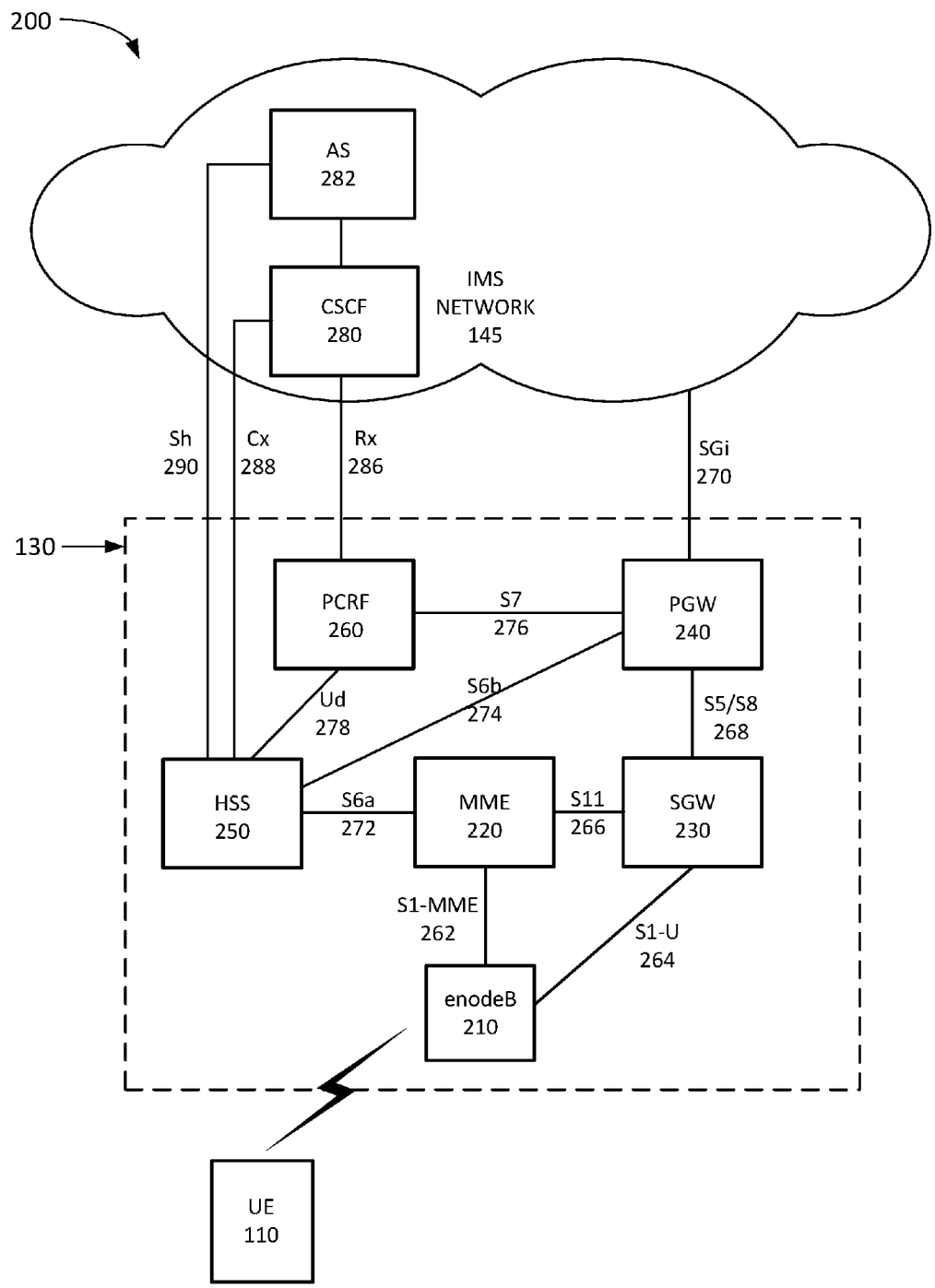
FIG. 2 is a diagram illustrating exemplary components of the access network of FIG. 1 and exemplary components of an Internet Protocol Multimedia Subsystem network that may be included in the core network of FIG. 1.

FIG. 2 is a diagram illustrating exemplary components of a system 200 that includes access network 130 and IMS network 145 according to an implementation described herein. As shown in FIG. 2, system 200 may include UE device 110, access network 130, and IMS network 145. Access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include eNodeB 210 (corresponding to base station 135), a mobility management entity (MME) 220, a serving gateway (SGW) 230, a packet data network gateway (PGW) 240, a home subscriber server (HSS) 250, and a Policy and Charging Rules Function (PCRF) 260. IMS network 145 may include a CSCF 280 and an AS 282. While FIG. 2 depicts a single eNodeB 210, MME 220, SGW 230, PGW 240, HSS 250, PCRF 260, CSCF 280, and AS 282 for illustration purposes, in other implementations, FIG. 2 may include multiple eNodeBs 210, MMES 220, SGWs 230, PGWs 240, HSS's 250, PCRFs 260, CSCFs 280, and/or ASes 282.

eNodeB 210 may include one or more devices (e.g., base stations) and other components and functionality that allow UE device 110 to wirelessly connect to access network 130. eNodeB 210 may include or be associated with one or more cells. For example, each cell may include a radio frequency (RF) transceiver facing a particular direction. eNodeB 210 may interface with access network 130 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a Network Access Server (NAS) protocol and/or Stream Control Transmission Protocol (SCTP). An S1-U interface 264 may interface with SGW 230 and may be implemented, for example, using GTPv2.

MME 220 may implement control plane processing for access network 130. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMES 220 in access network 130 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to core network 140 and/or IMS network 145 through an SGi interface 270. A particular UE device 110, while shown as connected to a single SGW 230, may be connected to multiple PGWs 240, one for each packet network with which UE device 110 communicates.

MME 220 may communicate with SGW 230 through an S11 interface 266. S11 interface 266 may be implemented, for example, using GTPv2. S11 interface 266 may be used to create and manage a new session for a particular UE device 110. S11 interface 266 may be activated when MME 220 needs to communicate with SGW 230, such as when the particular UE device 110 attaches to access network 130, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e.g., authorized to connect to access network 130 and to IMS network 145 via access network 130).

MME 220 may communicate with HSS 250 through an S6a interface 272. S6a interface 272 may be implemented, for example, using a Diameter protocol. PGW device 240 may communicate with HSS device 250 through an S6b interface 274. S6b interface 274 may be implemented, for example, using a Diameter protocol.

PCRF 260 may implement policy charging and rule functions, such as establishing QoS requirements, bandwidth, and/or charges for a particular service for a UE device 110. PCRF 260 may communicate with PGW 276 through an S7 interface 276 and may communicate with HSS 250 through a Ud interface 278. S7 interface 276 may be based on a legacy Gx interface and may be implemented, for example, using Diameter protocol. Ud interface 278 may be used to exchange subscription data between PCRF 260 and HSS 250 and may be based on a provider specified protocol.

IMS network 145 may be associated with an IMS core identity for a particular subscription for UE device 110. HSS 250 may receive information identifying the IMS core identity for a subscription and may provide the IMS core identity to a particular UE device 110 that is connected to access network 130. CSCF device 280 may handle signaling, controlling of media paths, and activation of applications in IMS network 145. AS device 282 may implement particular services and interact with CSCF device 280 to deliver the particular services to UE device 110. Examples of services provided by AS device 282 may include multimedia telephone services or IP television services. CSCF 280 may communicate with PCRF 260 through an Rx interface 286 and may communicate with HSS 250 through a Cx interface 288. Rx interface 286 and Cx interface 288 may be implemented, for example, using Diameter protocol. AS 282 may communicate with HSS 250 through an Sh interface 290. Sh interface 290 may be implemented, for example, using Diameter protocol.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3:
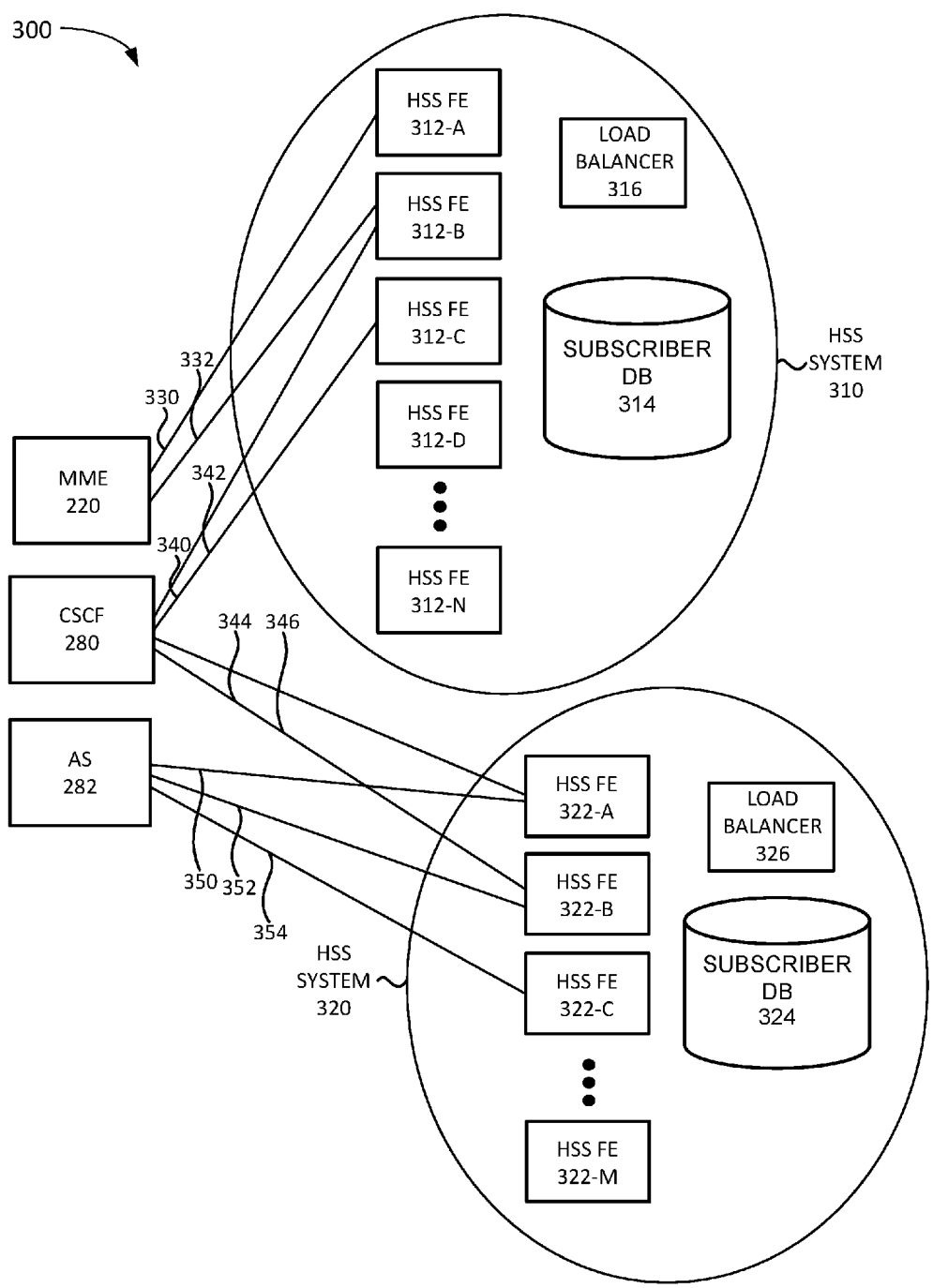
FIG. 3 is a diagram illustrating an exemplary implementation of a Home Subscriber Server system for a Home Subscriber Server of FIG. 2.

FIG. 3 is a diagram illustrating an exemplary implementation of a system 300 that includes an implementation of HSS 250 as a collection of logical entities. As shown in FIG. 3, system 300 may include HSS system 310 and HSS system 320. Also shown in FIG. 3 are MME 220, CSCF 280, and AS 282 communicating with HSS system 310 and HSS system 320.

HSS system 310 may function as an HSS logical entity serving a pool of UE devices 110. For example, HSS system 310 may serve UE devices 110 within a particular geographic area. HSS system 310 may include HSS front ends (FEs) 312-A to 312-N, a subscriber database (DB) 314, and a load balancer 316. HSS FE 312 may be configured to function as HSS 250. For example, HSS FE 312 may respond to requests for subscriber information and may access subscriber DB 314 to retrieve the requested subscriber information. Subscriber DB 314 may store subscriber information for UE devices 110 served by HSS system 310. Load balancer 316 may function as a DRA that receives Diameter requests and perform load balancing to route a Diameter request to one of HSS FEs 312. For example, load balancer 316 may distribute Diameter requests to HSS FEs 312 to balance out the requests between particular ones of HSS FEs 312.

HSS system 320 may function as an HSS logical entity serving a pool of UE devices 110 similarly to HSS 310. For example, HSS system 320 may serve UE devices 110 within a different geographic area from the geographic area served by HSS system 310. HSS system 320 may include HSS FEs 322-A to 32-M, a subscriber DB 324, and a load balancer 326. HSS FEs 322 may function as described above with respect to HSS FEs 312, subscriber DB 324 may function as described above with respect to subscriber DB 314, and load balancer 326 may function as described above with respect to load balancer 316.

An exemplary exchange of Diameter messages is further shown in FIG. 3. As an example, when MME 220 needs to communicate with HSS 250, MME 220 may exchange messages with HSS system 310 as shown in FIG. 3. A first request 330, on behalf of a first UE device 110, from MME 220 may be routed by load balancer 316 to HSS FE 312-A and a second request 332, on behalf of a second UE device 110, may be routed by load balancer 316 to HSS FE 312-B.

Similarly, as another example, when CSCF 280 needs to communicate with HSS 250, CSCF 280 may exchange messages with HSS system 310 and HSS system 320 as shown in FIG. 3. A first request 340, on behalf of a first UE device 110 served by HSS system 310, from CSCF 280 may be routed by load balancer 316 to HSS FE 312-B; a second request 342, on behalf of a second UE device 110 served by HSS system 310, may be routed by load balancer 316 to HSS FE 312-C; a third request 344, on behalf of a third UE device 110 served by HSS system 320, may be routed by load balancer 326 to HSS FE 322-A; and a fourth request 346, on behalf of a fourth UE device 110 served by HSS system 320, may be routed by load balancer 326 to HSS FE 322-B.

As yet another example, when AS 282 needs to communicate with HSS 250, AS 282 may exchange messages with HSS system 320 as shown in FIG. 3. A first request 350, on behalf of a first UE device 110 served by HSS system 320, from AS 282 may be routed by load balancer 326 to HSS FE 322-A; a second request 352, on behalf of a second UE device 110 served by HSS system 320, may be routed by load balancer 326 to HSS FE 322-B; and a third request 354, on behalf of a third UE device 110 served by HSS system 320, may be routed by load balancer 326 to HSS FE 322-C.

Although FIG. 3 shows exemplary components of system 300, in other implementations, system 300 may include fewer components, different components, differently arranged components, or additional components than depicted in FIG. 3. Additionally or alternatively, one or more components of system 300 may perform functions described as being performed by one or more other components of system 300.

Figure 4:
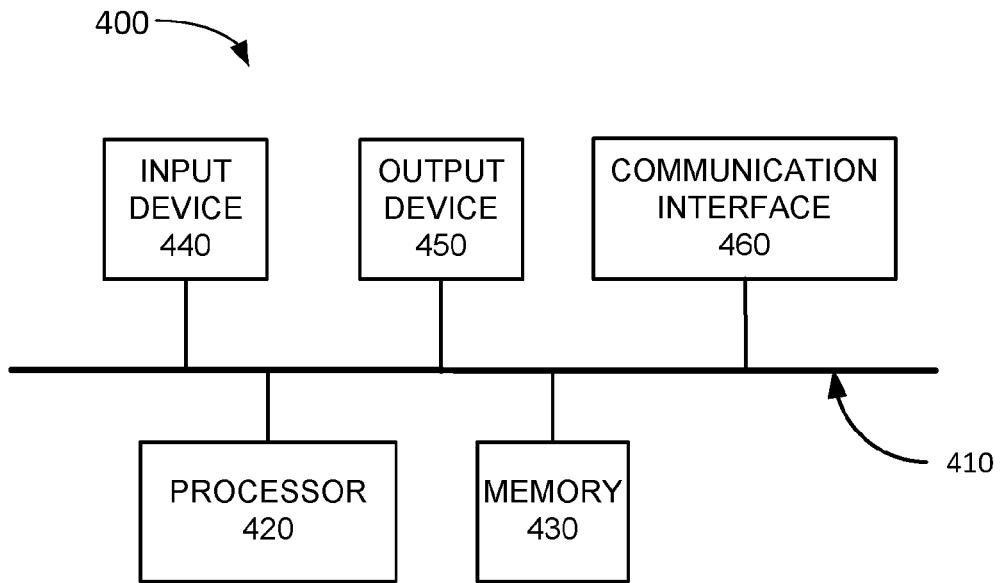
FIG. 4 is a diagram illustrating exemplary components of a device that may be included in one or more components of FIG. 2.

FIG. 4 is a diagram illustrating exemplary components of a device 400 according to an implementation described herein. eNodeB 210, MME 220, SGW 230, PGW 240, HSS 250, PCRF 260, CSCF 280, and/or AS 282 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include an LCD for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to supported features discovery and management. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than those depicted in FIG. 4. Additionally or alternatively, one or more components of device 400 may perform one or more tasks described as being performed by one or more other components of device 400.

Figure 5:
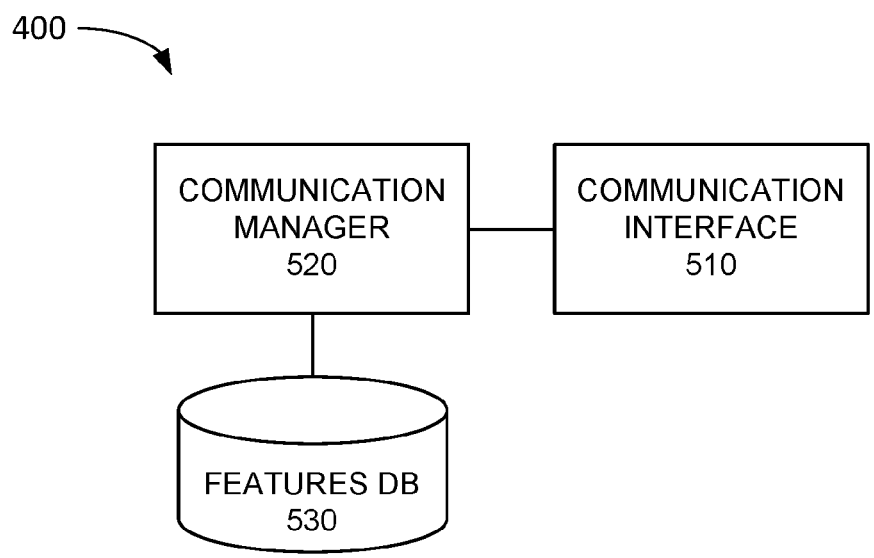
FIG. 5 is a diagram illustrating exemplary functional components of the device of FIG. 4.

FIG. 5 is a diagram illustrating exemplary functional components of device 400 according to a first implementation described herein. The functional components of device 400 may be implemented, for example, via processor 420 executing instructions from memory 430. Alternatively, some or all of the functional components of device 400 may be implemented via hard-wired circuitry. As shown in FIG. 5, device 400 may include a communication interface 510, a communication manager 520, and a features DB 530.

Communication interface 510 may be configured to communicate with other devices 400. For example, communication interface 510 may be configured to implement particular interfaces and/or to send and receive messages using a particular protocol. Communication manager 520 may manage sending and receiving of messages to other devices 400. Communication manager 520 may configure a message to a particular device 400 based on information stored in features DB 530. Features DB 530 may store information relating to supported features associated with particular devices 400. Exemplary information that may be stored in features DB 530 is described below with reference to FIG. 6.

Although FIG. 5 shows exemplary functional components of device 400, in other implementations, device 400 may include fewer functional components, different functional components, differently arranged functional components, or additional functional components than depicted in FIG. 5. Additionally, or alternatively, one or more functional components of device 400 may perform functions described as being performed by one or more other functional components of device 400.

Figure 6:
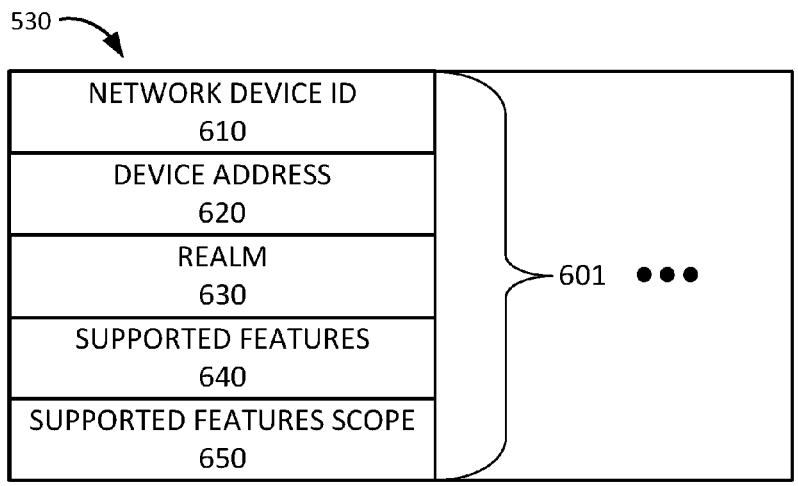
FIG. 6 is a diagram illustrating exemplary components of the features database (DB) of FIG. 5.

FIG. 6 is a diagram illustrating exemplary components of features DB 530. As shown in FIG. 6, features DB 530 may include one or more network device records 601. Each network device record 601 may store information relating a particular network device. Network device record 601 may include a network device identifier (ID) 610, a device address field 620, a realm field 630, a supported features field 640, and a supported features scope field 650.

Network device ID field 610 may include an identifier (e.g., data) that uniquely identifies a particular device 400. Device address field 620 may store an address for the particular device 400 (e.g., an IP address, a SIP ID, a Diameter ID, etc.). Realm field 630 may identify a realm associated with the particular device 400. Supported features field 640 may store a list of supported features associated with the particular device 400. For example, the list of supported features may include a list of applications that have been installed and/or activated on the particular device 400. Supported features scope field 650 may include information identifying the supported features scope for the list of supported features includes in supported features field 650. For example, supported features scope field 650 may identify whether the list of supported features applies only to a host (e.g., only to the particular device 400) or to the realm specified in realm field 630.

Although FIG. 6 shows exemplary fields stored in features DB 530, in other implementations, features DB 530 may include fewer fields, different fields, differently arranged fields, or additional fields than depicted in FIG. 6.

Figure 7:
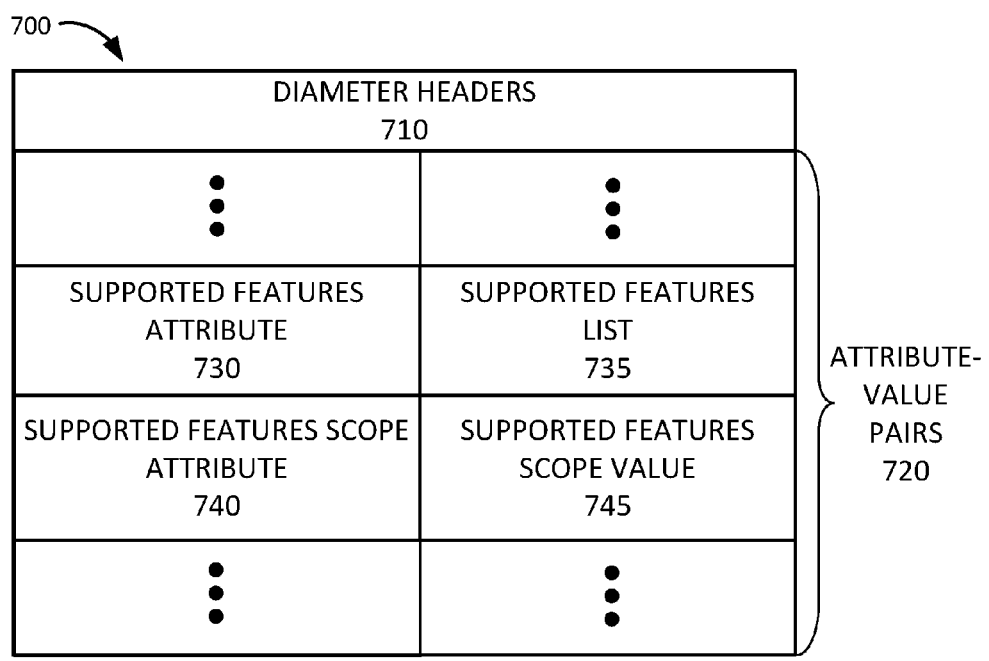
FIG. 7 is a diagram illustrating exemplary components of a Diameter protocol message according in an implementation described herein.

FIG. 7 is a diagram illustrating exemplary components of a Diameter protocol message 700 according to an implementation described herein. As shown in FIG. 7, Diameter protocol message may include Diameter headers 710 and a set of AVPs 720. Diameter headers 710 may include a version field, a message length field, a flags field, a command code field, an application ID field, a hop by hop ID field, an end to end ID field, and/or other header fields. AVPs 720 may include particular AVPs included in Diameter protocol message 700. AVPs 720 may include a Supported-Features attribute field 730 and a corresponding supported features list field 735 and a Supported-Features-Scope attribute field 740 and a supported features scope value field 745.

For example, supported features scope value field 745 may include a Host value indicating that the supported features scope applies to a specific host that sent Diameter protocol message 700, a Realm value indicating that the supported features scope applies to a realm (e.g., a group of host devices functioning as a logical entity) to which the specific host belongs, and/or another value. As an example, in some implementations, the specific host may belong to multiple realms and supported features scope value field 745 may specify a particular realm. As another example, supported features scope value field 745 may specify a particular time and/or date at which a scope changes (e.g., from Host to Realm, from a first Realm to a second Realm, etc.) and or may specify a particular time and/or date when a particular feature included in supported features list field 735 becomes activated or deactivated.

Although FIG. 7 shows exemplary fields stored in Diameter protocol message 700, in other implementations, Diameter protocol message 700 may include fewer fields, different fields, differently arranged fields, or additional fields than depicted in FIG. 7. For example, in other implementations, Supported-Features-Scope attribute field 740 and a supported features scope value field 745 may be included as sub-fields in supported features list field 735.

Figure 8:
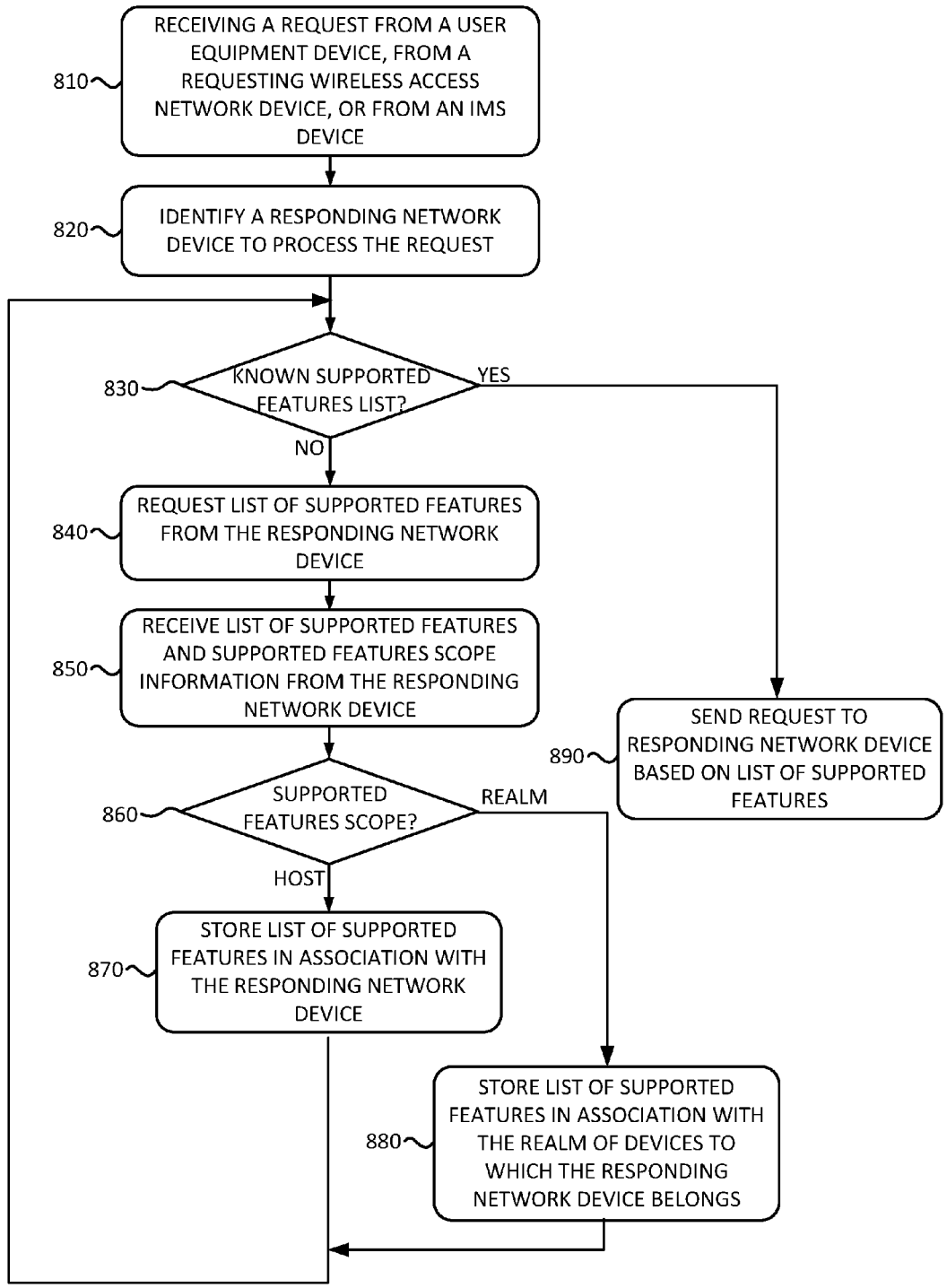
FIG. 8 is a flowchart of a process for obtaining and using a supported features scope attribute according to an implementation described herein.

FIG. 8 is a flowchart of a process for obtaining and using a supported features scope attribute according to an implementation described herein. In some implementations, the process of FIG. 8 may be performed by device 400. In other implementations, some or all of the process of FIG. 8 may be performed by another device or a group of devices separate from device 400.

The process of FIG. 8 may include receiving a request from a UE device 110, from a requesting wireless access network device, or an IMS device (block 810). As an example, eNodeB 210, MME 220, SGW 230, and/or PGW 240, may receive a request from UE device 110 to access subscriber information for UE device 110, to authenticate UE device 110, to authorize UE device 110 for a particular service, to establish a network connection, to reserve network resources for a particular Quality of Service (QoS) class, and/or a request to perform another type of service. As another example, CSCF 280 and/or AS 282 may request subscriber information for UE device 110 for a multimedia service requested by UE device 110, for a call for which UE device 110 is an intended recipient, and/or for a request based on another reason. As yet another example, PCRF 260 may request charging information for UE device 110 from PGW 240.

A responding network device to process the request may be identified (block 820). As an example, MME 220 may send a request to a Subscriber Locator Function (SLF) to identify a particular HSS 250 associated with UE device 110. As another example, MME 220 may identify HSS system 310 that serves UE device 110 based on a database maintained by MME 220 and/or based on information received from UE device 110. As another example, CSCF 280 may identify HSS system 310 that serves UE device 110 based on information included in a SIP message received by CSCF 280 and/or based on database maintained by CSCF 280.

A determination may be made as to whether a supported feature list is known (block 830). For example, device 400 may access supported features field 640 of features record 601 for the identified responding network device to determine whether the list of supported features has been previously obtained. If it is determined that the supported feature list is not known (block 830—NO), a list of supported features may be requested from the responding network device (block 840). For example, device 400 may send a Diameter Update-Location-Request (ULR) message to the identified responding network device. The ULR message may include a request for the list of supported features.

A list of supported features and supported feature scope information may be received from the responding network device (block 850) and the supported features scope may be determined (block 860). For example, the responding network device may respond with a Diameter Update-Location-Answer (ULA) message that includes a Supported-Features AVP and a Supported-Features-Scope AVP. Device 400 may retrieve the supported features scope value from the Supported-Features-Scope AVP.

If it is determined that the supported features scope corresponds to a host value (block 860—HOST), the list of supported features may be stored in association with the responding network device (block 870). For example, communication manager 520 of device 400 may store the list of supported features only in features record 601 associated with the responding network device. Processing may return to block 830.

Returning to block 860, if it is determined that the supported features scope corresponds to a realm value (block 860—REALM), the list of supported features may be stored in association with the realm of devices to which the responding network device belongs (block 880). For example, communication manager 520 of device 400 may identify the realm associated with the responding network device based on information stored in realm field 630 of features record 601 of the responding network device and may identify all other network devices associated with the identified realm. Communication manager 520 of device 400 may then store the list of supported features in features records 601 for all the devices associated with the identified realm. Processing may return to block 830.

Returning to block 830, if it is determined that the supported feature list is known (block 830—YES), the request may be sent to the responding network device based on the list of supported features (block 890). For example, communication manager 520 of device 400 may generate a Diameter message that makes use of the supported features associated with the responding network device. For example, the Diameter message may include a request for a particular application installed and/or activated on the responding network device.

Figure 9:
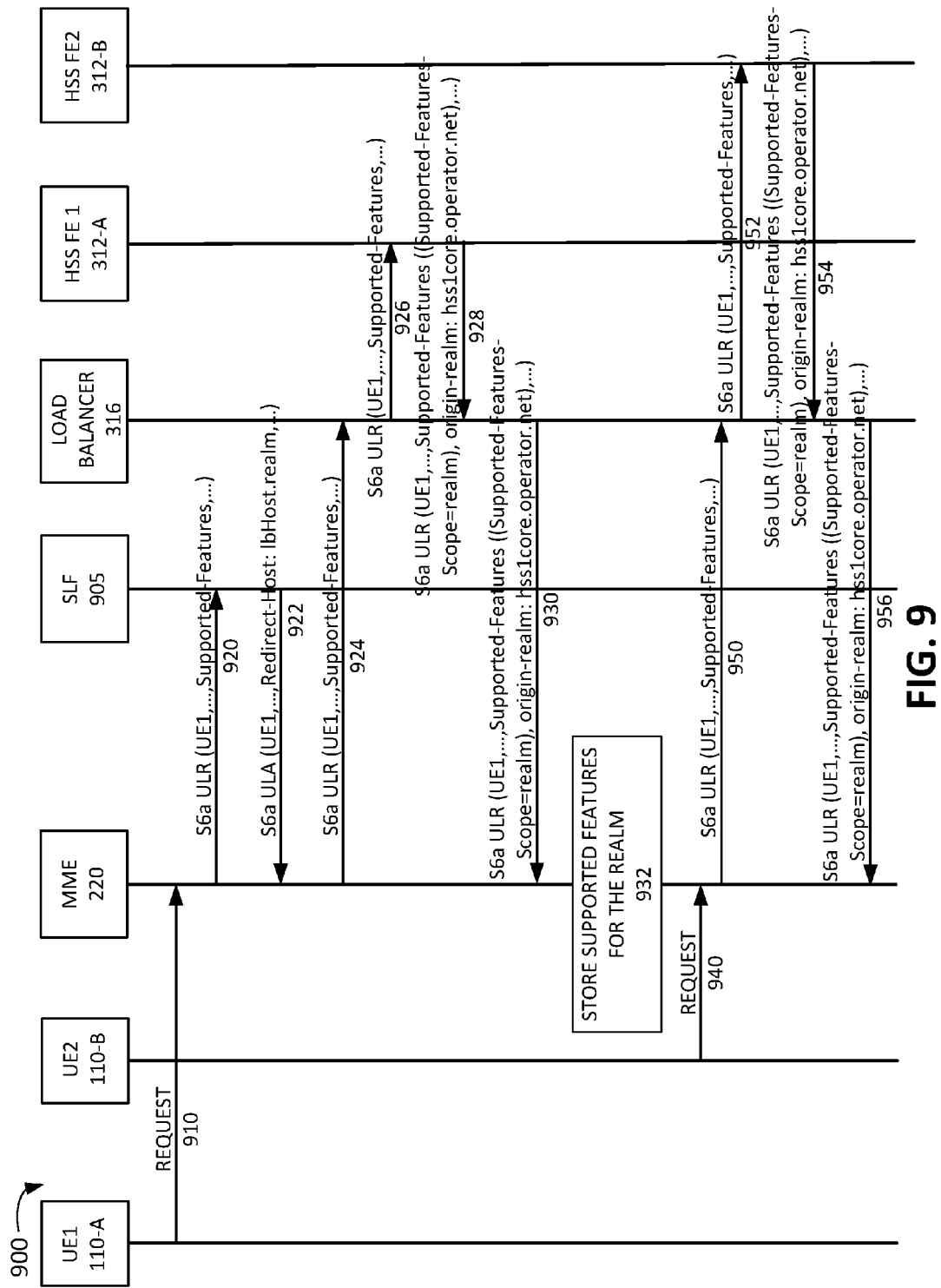
FIG. 9 is a diagram of an exemplary signal flow according to an implementation described herein.

FIG. 9 is a diagram of an exemplary signal flow 900 according to an implementation described herein. Signal flow 900 may include UE device 110-A sending a request to MME 220 (signal 910). The request may include, for example, a request to establish IP connectivity to IMS network 145 via PGW 240. MME 220 may send a Diameter ULR message to SLF 905 to identify an HSS 250 associated with UE device 110-A (signal 920). The request may include a request for the list of supported features. SLF 905 may redirect the request from MME 220 to load balancer 316 by sending a Diameter ULA back to MME 220 and MME 220 may forward the Diameter ULR to load balancer 316 (signals 922 and 924).

Load balancer 316 may select HSS FE 312-A and may forward the request to HSS FE 312-A (signal 926). HSS FE 312-A may respond with a Diameter ULA message that includes a list of supported features and supported features scope information and may send the ULA message to load balancer 316 and load balancer 316 may forward the message to MME 220 (signals 928 and 930). Assume the supported features scope information includes a Realm value that identifies the list of supported features as being valid for all HSS FEs 312 associated with HSS system 310 and with load balancer 316. MME 220 may store the supported features for the realm (block 932). For example, MME 220 may store the list of supported features in features record 601 for each HSS FE 312 associated with HSS system 310. Alternatively, MME 220 store a features record 601 for HSS system 310 and may associate the list of supported features with HSS system 310.

At a later time, MME 220 may receive a request from UE device 110-B (signal 940) and may determine that UE device 110-B is services by HSS system 310. MME 220 may determine that the list of supported features for HSS system 310 has been obtained and is valid for the whole realm. Thus, MME 220 may not need to know which HSS FE 312 is to be selected to process the request and may utilize any supported features included in the list of supported features associated with HSS system 310. Therefore, MME 220 may send a Diameter ULR message to load balancer 316 and load balancer 316 may select HSS FE 312-B to process the request (signals 950 and 952). HSS FE 312-B may respond to the request via load balancer 316 (signals 954 and 956).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 8, and a series of signal flows has been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
receiving, by the computer device, a request from a user equipment device, from a requesting wireless access network device, or from an Internet Protocol Multimedia Subsystem (IMS) device;
identifying, by the computer device, a responding wireless access network device to process the request;
determining, by the computer device, whether information identifying supported features for the responding wireless access network device has been obtained by the computer device by accessing a supported features field of a network device record, associated with the responding wireless access network device, in a features database associated with the computer device;
requesting, by the computer device, a list of supported features from the responding wireless access network device, when the information identifying the supported features for the responding wireless access network device has not been obtained by the computer device;
receiving, by the computer device and from the responding wireless access network device, a response that includes the list of the supported features and that further includes supported features scope information that indicates whether the list of supported features applies only to the responding wireless access network device or to a plurality of devices that include the responding wireless access network device;
storing, by the computer device, the supported features scope information in association with the responding wireless access network device or the plurality of devices that include the responding wireless access network device; and
using, by the computer device, the supported features scope information when forwarding requests to the responding wireless access network device or the plurality of devices.

2. The method of claim 1, further comprising:
sending the request to the responding wireless access network device based on the information identifying the supported features, when the information identifying the supported features for the responding wireless access network device has been obtained by the computer device.

3. The method of claim 1, wherein the supported features scope information indicates that the list of supported features applies to the plurality of devices, and wherein using the supported features scope information when forwarding requests to the responding wireless access network device or the plurality of devices includes:
receiving another request;
identifying another wireless access network device to process the other request;
determining that the other wireless access network device is one of the plurality of devices;
associating the list of the supported features with the other wireless access network device based on determining that the other wireless access network device is one of the plurality of devices; and
sending the other request to the other wireless access network device using the list of supported features.

4. The method of claim 1, wherein the response that includes the list of the supported features and the supported features scope information includes a Diameter protocol message, and wherein the supported features scope information corresponds to an attribute-value pair included in the Diameter protocol message.

5. The method of claim 4, wherein the responding wireless access network device includes a Diameter Routing Agent (DRA) configured as a load balancer for a plurality of Home Subscriber Server (HSS) front end devices.

6. The method of claim 4, wherein the attribute-value pair includes a Supported Features Scope attribute and a Host value that indicates that the list of supported features applies only to the responding wireless access network device or a Realm value that indicates that the list of supported features applies to the plurality of devices.

7. The method of claim 1, wherein the supported features scope information identifies a realm associated with the plurality of devices and a list of supported features associated with the identified realm.

8. The method of claim 1, wherein the computer device includes a Mobility Management Entity (MME).

9. A computer device comprising:
logic configured to:
receive a request from a user equipment device, from a requesting wireless access network device, or from an Internet Protocol Multimedia Subsystem (IMS) device;
identify a responding wireless access network device to process the request;
determine whether information identifying supported features for the responding wireless access network device has been obtained by the computer device by accessing a supported features field of a network device record, associated with the responding wireless access network device, in a features database associated with the computer device;
request a list of the supported features from the responding wireless access network device, when the information identifying the supported features for the responding wireless access network device has not been obtained by the computer device;
receive, from the responding wireless access network device, a response that includes the list of the supported features and that further includes supported features scope information that indicates whether the list of supported features applies only to the responding wireless access network device or to a plurality of devices that include the responding wireless access network device;
store the supported features scope information in association with the responding wireless access network device or the plurality of devices that include the responding wireless access network device; and
use the supported features scope information when forwarding requests to the responding wireless access network device or the plurality of devices.

10. The computer device of claim 9, wherein the logic is further configured to:
send the request to the responding wireless access network device based on the information identifying the supported features, when the information identifying the supported features for the responding wireless access network device has been obtained by the computer device.

11. The computer device of claim 9, wherein the supported features scope information indicates that the list of supported features applies to the plurality of devices, and wherein, when using the supported features scope information when forwarding requests to the responding wireless access network device or the plurality of devices, the logic is further configured to:
  receive another request;
  identify another wireless access network device to process the other request;
  determine that the other wireless access network device is one of the plurality of devices;
  associate the list of the supported features with the other wireless access network device based on determining that the other wireless access network device is one of the plurality of devices; and
  send the other request to the other wireless access network device using the list of supported features.

12. The computer device of claim 9, wherein the response that includes the list of the supported features and the supported features scope information includes a Diameter protocol message, and wherein the supported features scope information corresponds to an attribute-value pair included in the Diameter protocol message.

13. The computer device of claim 12, wherein the responding wireless access network device includes a Diameter Routing Agent (DRA) configured as a load balancer for a plurality of Home Subscriber Server (HSS) front end devices.

14. The computer device of claim 12, wherein the attribute-value pair includes a supported features scope attribute and a host value that indicates that the list of supported features applies only to the responding wireless access network device or a realm value that indicates that the list of supported features applies to the plurality of devices.

15. The computer device of claim 9, wherein the supported features scope information identifies a realm associated with the plurality of devices and a list of supported features associated with the identified realm.

16. The computer device of claim 9, wherein the computer device includes a Mobility Management Entity (MME).

17. A non-transitory memory device storing instructions executable by one or more processors, the non-transitory memory device comprising:
  one or more instructions to receive, by a computer device, a request from a user equipment device, from a requesting wireless access network device, or from an Internet Protocol Multimedia Subsystem (IMS) device;
  one or more instructions to identify a responding wireless access network device to process the request;
  one or more instructions to determine whether information identifying supported features for the responding wireless access network device has been obtained by the computer device by accessing a supported features field of a network device record, associated with the responding wireless access network device, in a features database associated with the computer device;
  one or more instructions to request a list of supported features from the responding wireless access network device, when the information identifying the supported features for the responding wireless access network device has not been obtained by the computer device;
  one or more instructions to receive, from the responding wireless access network device, a response that includes the list of the supported features and that further includes supported features scope information that indicates whether the list of supported features applies only to the responding wireless access network device or to a plurality of devices that include the responding wireless access network device;
  one or more instructions to store the supported features scope information in association with the responding wireless access network device or the plurality of devices that include the responding wireless access network device; and
  one or more instructions to use the supported features scope information when forwarding requests to the responding wireless access network device or the plurality of devices.

18. The non-transitory memory device of claim 17, further comprising:
  one or more instructions to send the request to the responding wireless access network device based on the information identifying the supported features, when the information identifying the supported features for the responding wireless access network device has been obtained by the computer device.

19. The non-transitory memory device of claim 17, wherein the supported features scope information indicates that the list of supported features applies to a plurality of devices, and wherein, the one or more instructions to use the supported features scope information when forwarding requests to the responding wireless access network device or the plurality of devices further include:
  one or more instructions to receive another request;
  one or more instructions to identify another wireless access network device to process the other request;
  one or more instructions to determine that the other wireless access network device is one of the plurality of devices;
  one or more instructions to associate the list of the supported features with the other wireless access network device based on determining that the other wireless access network device is one of the plurality of devices; and
  one or more instructions to send the other request to the other wireless access network device using the list of supported features.

20. The non-transitory memory device of claim 17, wherein the response that includes the list of the supported features and the supported features scope information includes a Diameter protocol message, and wherein the supported features scope information corresponds to an attribute-value pair included in the Diameter protocol message.

* * * * *